March 17, 1959 G. A. PETERSEN 2,877,574
REVERSIBLE DIGGING TOOTH
Filed Nov. 5, 1956
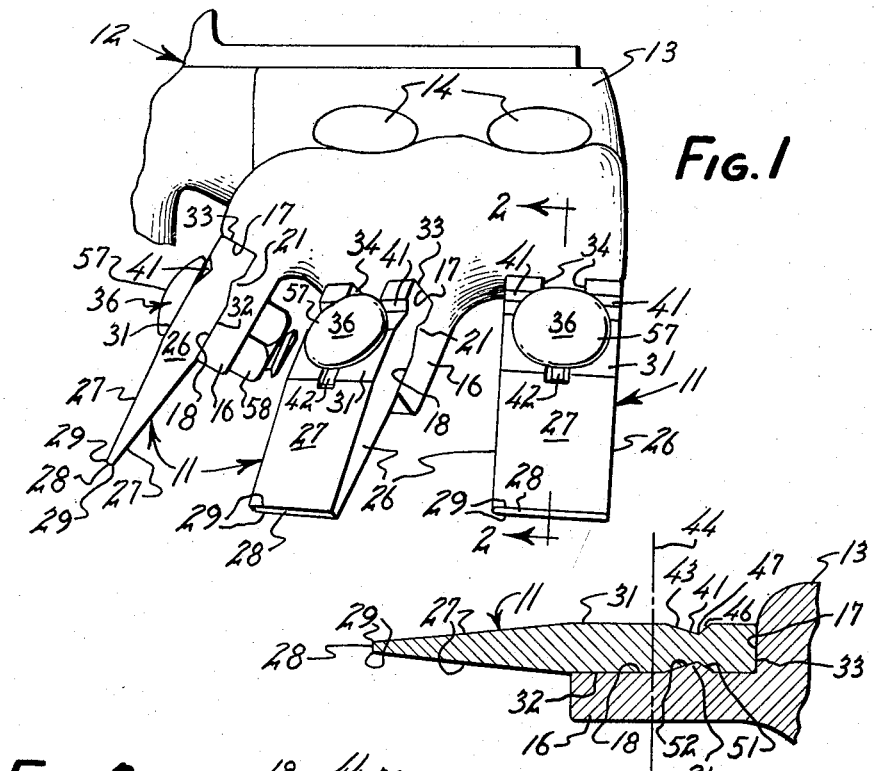
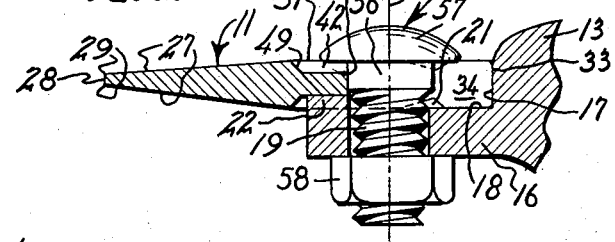
INVENTOR.
GERALD A. PETERSEN
BY Julian Caplan
ATTORNEY

United States Patent Office 2,877,574
Patented Mar. 17, 1959

2,877,574

REVERSIBLE DIGGING TOOTH

Gerald A. Petersen, Santa Clara, Calif.

Application November 5, 1956, Serial No. 620,291

9 Claims. (Cl. 37—142)

This invention relates to a new and improved reversible tooth for earth-digging equipment, such as earth augers and the like. At the present time earth digging equipment of various types employs a plurality of digging teeth which absorb much of the wear encountered by the tool and also are the portion of the equipment most likely to be broken. The present invention relates to a replaceable tooth for earth-digging equipment which is conveniently and rapidly replaceable and which further may be reversed so that when the tooth is worn on one side, it may be turned over and used on the other side.

Accordingly, one of the principal objects and advantages of the present invention is the provision of a tooth which may be attached to and removed from a shank plate or other portion of an earth-digging tool or other piece of similar equipment with a minimum of time and effort.

Another object and advantage of the invention is the provision of a reversible tooth which may be used first on one side and, when worn, may be turned over and used on the other side. One of the particular features of the invention is the facility with which the tooth may be reversed and, after having been reversed, securely locked in position with a minimum of labor and without the use of special tools or equipment.

Still another feature of the invention is the provision of cooperating means on the tooth and shank plate or other portion of the equipment to which the tooth is attached, which assist in securing the tooth in place.

A still further feature of the invention is the provision of cooperating means on the tooth and shank plate to which it is attached which prevent the tooth from being displaced from its proper position when the tooth is subjected to severe stress, such as striking a hard object at one corner of the tooth.

One of the principal advantages of the instant invention is the fact that wear of the tooth occurs on its edge. In other forged replaceable teeth, the means of connection employs a stud and a socket. Wear occurs in the zone of connection between the stud and socket, which is particularly subject to abrasion and other frictional deterioration. Since the socket is conventionally a permanent part of the earth digging equipment, deterioration of this part of the connection causes discard of the equipment, thereby defeating a primary reason for the use of replaceable teeth. The instant invention eliminates use of replaceable teeth. The instant invention eliminates the socket principle and the tooth is wide enough to protect the underlying shank from wear; hence the shank is truly permanent and need not be replaced despite wearing out of many replaceable teeth.

Other objects of the present invention will become apparent upon reading the following specification and referring to the accompanying drawings in which similar characters of reference represent corresponding parts in each of the several views.

In the drawings:

Fig. 1 is a perspective view of a portion of a piece of earth-digging equipment, such as an earth auger, with a plurality of teeth constructed in accordance with this invention attached thereto;

Fig. 2 is an enlarged sectional view taken substantially along the line 2—2 of Fig. 1;

Fig. 3 is an enlarged top plan view of a tooth and a portion of the adjacent shank; and Fig. 4 is a sectional view taken substantially along the line 4—4 of Fig. 3.

The present invention relates to a reversible replaceable tooth 11. As shown in Fig. 1 of the accompanying drawings, a plurality of such teeth may be attached to a piece of earth-digging equipment, such as an earth auger 12 of the type used to dig holes for utility poles. Reference is made to my Patent No. 2,578,014 which illustrates an earth auger to which the present invention may be attached. As an integral part, or, as shown in the accompanying drawings, a separate part of such equipment, there is provided a shank plate 13 attached to the main portion of auger 12 by means of bolts 14. The shape of shank plate 13 varies considerably and the number of teeth 11 attached thereto is likewise the subject of variation. As illustrated in Fig. 1, one such shank plate 13 provides a means of attachment for three teeth 11, the attachment means for each tooth being substantially identical. Accordingly the attachment of a single tooth to the shank plate will be described.

Shank plate 13 is formed with a plurality of outwardly projecting roots 16 corresponding in number to the teeth and disposed in a direction and at an angle to the axis of rotation of the tool which is determined by proper engineering design. The width of root 16 is substantially the same as the width of tooth 11 and the length of the root is sufficient to form a secure attachment. Each root 16 is cut away in a step having a back wall 17 substantially perpendicular to the direction of the tooth and a bottom wall 18 substantially parallel to the direction of the tooth. The root is formed with an aperture 19 extending through bottom wall 18 adjacent the outer end of the root and centrally located relative to the sides thereof.

Projecting upward from bottom wall 18 are three protuberances 21, 21, 22. The two protuberances 21 are located inwardly of the central axis of aperture 19 and to either side thereof and the third protuberance 22 is located midway of the sides of the root and forwardly of aperture 19. Protuberances 21, 22 are of a shape and have a function as hereinafter described.

Tooth 11 is formed of a hard piece of metal so as to absorb wear and withstand shock. Tooth 11 is of substantially the same width throughout, having parallel side edges 26. The distal faces 27 of the tooth taper at an angle of approximately 6° and are truncated to form a forward end 28, thereby providing a first and a second cutting edge 29 on opposite faces of the tooth. One of the advantages of the present invention is the fact that the tooth may be used with one face upward and then reversed so that twice the wear may be obtained before the tooth need be replaced or resharpened. The proximal of the tooth has substantially parallel top and bottom faces 31 and 32 and rear end wall 33 perpendicular to faces 31 and 32 and side edges 26. Back end wall 33 of the tooth seats against back wall 17 of the step. A rectangular slot 34 extends forwardly from rear end wall 33 of the tooth and the length of slot 34 is such that when a carriage bolt 36 is inserted in the slot 34 and through aperture 19, tooth 11 is properly located in position.

Both the top and bottom proximal faces 31 and 32 of the tooth are formed with three depressions 41, 41, 42 corresponding in position to the three protuberances 21, 21, 22 on shank plate 13. As shown in Fig. 4 and considering the depression 41 in the top proximal face 31, each of the rearwardly disposed depressions 41 extends across the width of the tooth from slot 34 to side edge 26. The forward wall 43 of depression 41 slopes downwardly-rearwardly at an angle of approximately 15° commencing along a line displaced rearwardly from the center line 44 of bolt 36 a short distance. The rear wall 46 of the depression slants downwardly forwardly at an angle of 45° and intersects forward wall 43 to provide a maximum depth of the depression (as indicated by reference numeral 47) approximately one-quarter the thickness of the tooth.

Forward depression 42 has a width slightly greater than one-quarter the width of tooth 11 and has a depth approximately one-quarter the thickness of the tooth. Forward depression 42 is centrally disposed with respect to side edges 26 of the tooth and extends forwardly of forward wall 48 of slot 34 substantially horizontally a distance substantially equal to the width of depression 42. The forward wall 49 of depression 42 (as shown in Fig. 2 and considering the depression 42 in top face 31) slopes upwardly forwardly at an angle of approximately 45°.

Protuberances 21, 21, 22 on shank plate 13 are, as has been stated, positioned and shaped to fit snugly within depressions 41, 41, 42. Accordingly the rearward protuberances 21 on either side are formed extending inwardly from side edges 26 a distance equal to the width between slot 34 and edge 26 of tooth 11. The rearward face 51 of protuberance 21 is disposed at an angle of 45° with respect to bottom wall 18 and front face 52 slants downwardly forwardly at an angle of substantially 15°. Forward protuberance 22 has a width equal to the width of forward depression 42 on tooth 11 and a height equal to the depth thereof extending forwardly from aperture 19, and its corner edges are chamfered to assist in seating of the tooth.

Tooth 11 may be attached to shank plate 13 by a carriage bolt 36 having a square neck 56 under its head 57. The width of slot 34 is equal to the width of square neck 56 under head 57 of carriage bolt 36, and hence two sides of the square neck engage the side edges of slot 34 and a third side of the neck seats against front wall 48 of slot 34. When nut 58 is tightened on bolt 36, head 57 bears against top face 31 of tooth 11 and locks the tooth snugly to shank plate 13. The locking of the tooth to the shank plate is accomplished by the cooperation of the parts as heretofore described. Thus back face 33 of tooth 11 engages back wall 17 of shank plate 13 and bottom face 32 of the tooth engages bottom wall 18 of shank plate 13. In addition, protuberances 21, 21, 22 fit into depressions 41, 41, 42 and additionally neck 56 of bolt 36 engages the side and front walls of slot 34. In the event that tooth 11 strikes a hard object on one corner, protuberances 21, 21, 22 assist in preventing the tooth from being knocked out of alignment, inasmuch as they resist any twisting movement of the tooth.

It will be seen that in order to remove a tooth 11 it is not necessary to remove nut 58 completely from bolt 36 or to remove bolt 36 from aperture 19. Nut 58 is loosened sufficiently so that protuberances 21, 21, 22 clear depressions 41, 41, 42, whereupon the tooth may be drawn forwardly by reason of the fact that there is provided a slot 34 instead of merely a bolt hole. This feature of the invention materially simplifies reversing the tooth or replacing the same.

After the tooth has been used until one cutting edge 29 is worn, the tooth is reversed, as has been indicated, and the other edge 29 used. When the tooth must be replaced or resharpened, the construction heretofore described expedites these operations.

Although the foregoing invention has been described in some detail by way of illustration and example for purposes of clarity of understanding, it is understood that certain changes and modifications may be practiced within the spirit of the invention and scope of the appended claims.

I claim:

1. A tooth for an earth-digging tool comprising a unitary, hard piece of material having a tapered distal portion and a proximal portion formed with substantially parallel proximal faces, said proximal portion being formed with a slot extending forwardly from the proximal end of said tooth for the reception of fastening means in a direction transverse to said proximal faces, at least one of said proximal faces being formed with a plurality of depressions, at least one of said depressions being located rearwardly of the inner terminus of said slot, and a second of said depressions being located forwardly of said inner terminus of said slot.

2. A tooth for an earth-digging tool comprising a unitary, hard piece of material having a tapered distal portion and a proximal portion formed with substantially parallel proximal faces, said proximal portion being formed with a slot extending forwardly from the proximal end of said tooth for the reception of fastening means in a direction transverse to said proximal faces, at least one of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, and a third of said depressions being located forwardly of the inner terminus of said slot.

3. A tooth for an earth-digging tool comprising a unitary, hard piece of material having a tapered distal portion and a proximal portion formed with substantially parallel proximal faces, said proximal portion being formed with a slot extending forwardly from the proximal end of said tooth for the reception of fastening means in a direction transverse to said proximal faces, each of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, and a third of said depressions being located forwardly of the inner terminus of said slot.

4. A reversible tooth for an earth-digging tool comprising a unitary, hard piece of material having an outwardly tapered distal portion truncated to provide a first and a second cutting edge disposed on opposite faces of said tooth, and a proximal portion formed with substantially parallel proximal faces, said proximal portion being formed with a slot extending inwardly from the proximal end of said tooth, the edges of said slot being substantially parallel to the sides edge of said tooth, each of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, and a third of said depressions being located forwardly of the inner terminus of said slot.

5. A reversible tooth for an earth-digging tool comprising a unitary, hard piece of material having an outwardly tapered distal portion truncated to provide a first and a second cutting edge disposed on opposite faces of said tooth, and a proximal portion formed with substantially parallel proximal faces, said proximal portion being formed with a slot extending inwardly from the proximal end of said tooth, the edges of said slot being substantially parallel to the side edges of said tooth, each of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, each of said first and second depressions being shaped with a rearward wall disposed extending forwardly inwardly at an angle of approximately 45° and a forward wall intersecting said rearward wall extending rearwardly inwardly at an angle of approximately 15°, and a third of said depressions being located forwardly of the inner terminus of said slot.

6. In combination in an earth-digging tool, a shank formed with at least one step therein having a rear wall and a substantially transverse bottom wall, said shank being apertured in said bottom wall, a plurality of protuberances on said bottom wall, a tooth formed of a unitary piece of material, the proximal of said tooth fitting into said step and abutting said rear and bottom walls, thereof, said tooth having a tapered distal portion and a proximal portion formed with substantially parallel proximal faces, said proximal portion being formed with an aperture for the reception of fastening means in a direction transverse to said proximal faces, at least one of said proximal faces being formed with a plurality of depressions, a first of said depressions being located rearwardly of the inner terminus of said aperture and to one side thereof, a second of said depressions being located rearwardly of the inner terminus of said aperture and to the side thereof opposite to said first depression, and a third of said depressions being located forwardly of the inner terminal of said aperture, said protuberances fitting into said depressions, and fastening means passing through the aperture in the bottom wall of said step and through the aperture in said tooth and cooperating with said protuberances and depressions to secure said tooth to said shank against forces tending to twist said tooth relative to said shank.

7. In combination in an earth-digging tool, a shank formed with at least one step therein having a rear wall and a substantially transverse bottom wall, said shank being apertured in said bottom wall, a plurality of protuberances on said bottom wall, a tooth formed of a unitary piece of material, the proximal of said tooth fitting into said step and abutting said rear and bottom walls thereof, said tooth having an outwardly tapered distal portion and a proximal portion formed with substantially parallel proximal faces, said proximal portion being formed with a slot extending inwardly from the proximal end of said tooth, the edges of said slot being substantially parallel to the side edges of said tooth, each of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, and a third of said depressions being located forwardly of the inner terminus of said slot, said protuberances fitting into said depressions, and fastening means passing through the aperture in the bottom wall of said step and through the slot in said tooth and cooperating with said protuberances and depressions to secure said tooth to said shank against forces tending to twist said tooth relative to said shank.

8. In combination in an earth-digging tool, a shank formed with at least one step therein having a rear wall and a substantially transverse bottom wall, said shank being apertured in said bottom wall, a plurality of protuberances on said bottom wall, a tooth formed of a unitary piece of material, the proximal of said tooth fitting into said step and abutting said rear and bottom walls thereof, said tooth having an outwardly tapered distal portion and a proximal portion formed with substantially parallel proximal faces, said proximal portion being formed with a slot extending inwardly from the proximal end of said tooth, the edges of said slot being substantially parallel to the side edges of said tooth, each of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, each of said first and second depressions being shaped with a rearward wall disposed extending forwardly inwardly at an angle of approximately 45° and a forward wall intersecting said rearward wall extending rearwardly inwardly at an angle of approximately 15°, and a third of said depressions being located forwardly of the inner terminus of said slot, said protuberances fitting into said depressions, and fastening means passing through the aperture in the bottom wall of said step and through the slot in said tooth and cooperating with said protuberances and depressions to secure said tooth to said shank against forces tending to twist said tooth relative to said shank.

9. In combination in an earth digging tool, a shank formed with at least one step therein having a rear wall and a substantially transverse bottom wall, said shank being apertured in said bottom wall, a plurality of protuberances on said bottom wall, a tooth formed of a unitary piece of material, the proximal of said tooth fitting into said step and abutting said rear and bottom walls thereof, said tooth having a distal portion tapering outwardly and a proximal portion formed with substantially parallel proximal faces, said proximal portion being formed with a slot extending inwardly from the proximal end of said tooth, the edges of said slot being substantially parallel to the side edges of said tooth, each of said proximal faces being formed with a plurality of depressions, a first of said depressions being located rearwardly of the inner terminus of said slot and to one side thereof, a second of said depressions being located rearwardly of the inner terminus of said slot and to the side thereof opposite to said first depression, and a third of said depressions being located forwardly of the inner terminus of said slot, said protuberances fitting into said depressions, and a carriage bolt having a square neck passing through the aperture in the bottom wall of said step and through the slot in said tooth, said slot being dimensioned whereby two sides of said neck of said bolt abut the sides of said slot and a third side of said neck abuts the inner end of said slot, said bolt cooperating with said protuberances and depressions to secure said tooth to said shank against forces tending to twist said tooth relative to said shank.

References Cited in the file of this patent

UNITED STATES PATENTS

| | | |
|---|---|---|
| 537,287 | Hardsocg | Apr. 9, 1895 |
| 764,921 | Davidson | July 12, 1904 |
| 1,461,136 | Moore | July 10, 1923 |
| 2,472,892 | George | June 14, 1949 |
| 2,578,014 | Peterson | Dec. 11, 1951 |
| 2,712,280 | Peoples | July 5, 1955 |